July 27, 1954
I. S. ROBERTS
2,684,566
MAGNETIC SYSTEM FOR MULTIPLE TWIST SPINDLES
Filed Feb. 28, 1951
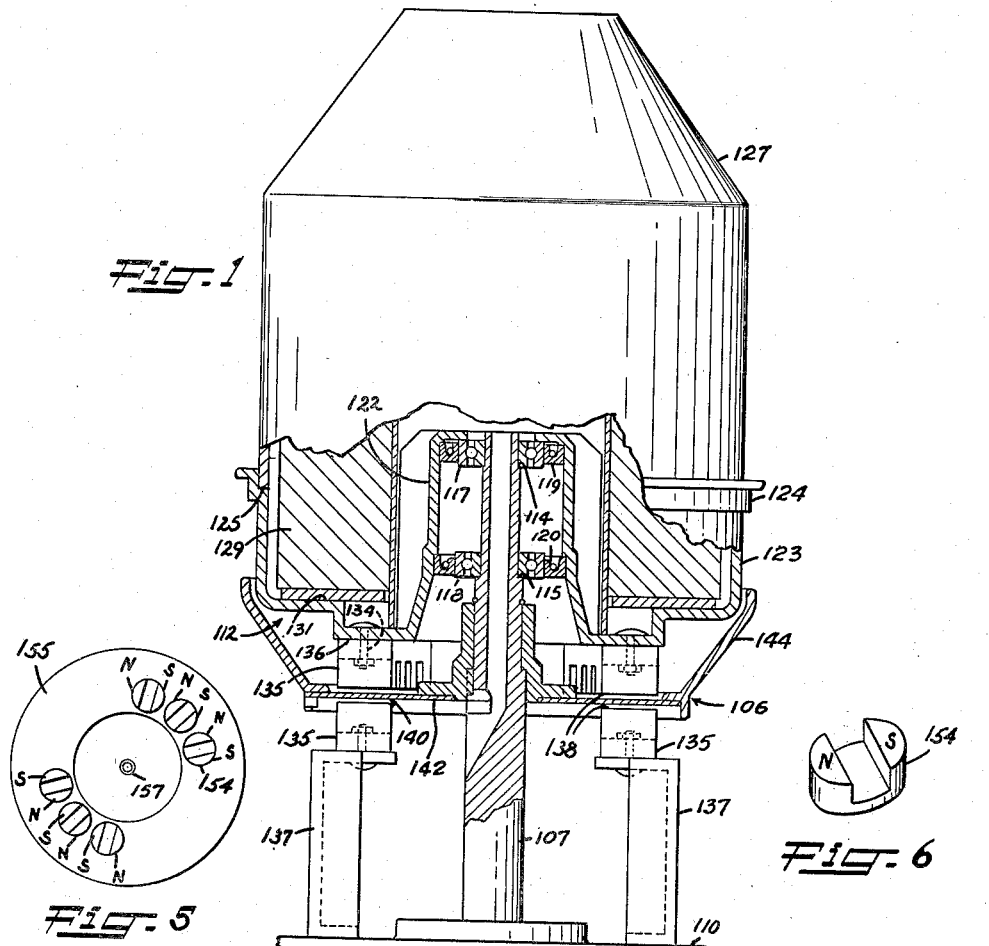
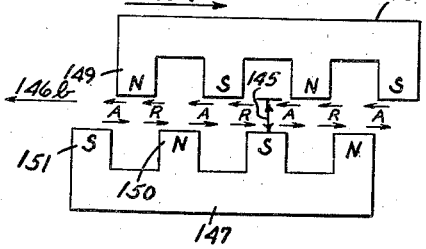
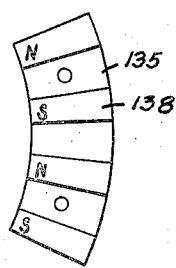
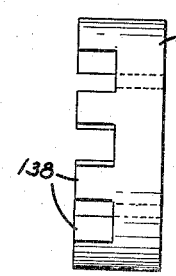
INVENTOR.
INGHAM S. ROBERTS
BY
Thomas R. O'Malley
ATTORNEY.

Patented July 27, 1954

2,684,566

UNITED STATES PATENT OFFICE 2,684,566

MAGNETIC SYSTEM FOR MULTIPLE TWIST SPINDLES

Ingham S. Roberts, Ridley Park, Pa., assignor to American Viscose Corporation, Wilmington, Del., a corporation of Delaware Application February 28, 1951, Serial No. 213,087

8 Claims. (Cl. 57—58.76)

This invention relates to apparatus for preventing the rotation of loosely mounted objects which are supported by rotary devices; such as are needed, for example, to prevent the rotation of the package holder of a multiple-twist twisting machine while supported on a rapidly rotating spindle.

A conventional up-twister of the multiple twist type includes a driving motor, the shaft of which is hollow and is extended to support a flyer secured thereto and rotatable therewith, and a package holder that is held stationary on the shaft, such as by gravitational or magnetic systems. The rotational speeds of such a machine are normally in the range of 6000 to 12,000 revolutions per minute.

Magnetic holding devices are in common use in textile twisting equipment which utilize stationary magnets of either the permanent or electromagnetic types. The magnets are usually to be found fixed to a stationary portion of the machine such as the driving motor housing immediately under the flyer or along the outside of the flyer rim. Elements comprising a magnetic or magnetized material are mounted in or on the base portion of the package holder. If a plurality of magnets is provided, a like number of elements of magnetized or magnetically sensitive material having an annular spacing corresponding to that of the magnets are mounted in the base or rim portion of the holder. The flyer section spaced intermediately between the stationary magnets and the magnetically sensitive elements of the holder is formed from a non-metallic or a non-electrically conductive material. The arrangements of magnets and material elements are necessarily space-consuming in order that they may be of sufficient size to establish efficient holding forces through the intervening air gap and flyer section, adding bulk, weight, and complexity to the equipment.

It is an object of the invention to provide magnetic means for supporting one member of an apparatus in rotatable relationship on another member and in non-rotatable relationship with respect to a third member which may be fixed or may rotate, and especially to provide means for preventing the rotation of a package holder of a twisting machine while the holder is supported on a rotating spindle thereof.

It is another object to obtain more efficient use of magnetic forces which are applied to a magnetically sensitive material of a rotatably supported member to maintain the relative angular position of the member about its axis with respect to spaced cooperating means for producing the magnetic currents.

Another object is to provide an arrangement of magnetic poles whereby a maximum holding force is obtained with a minimum amount of magnetic material in a minimum space.

Figure 1 illustrates partially in section the greater portion of a two-for-one twister with another specific form of magnetic holding means;

Figure 2 is a plan view of the pole faces of a multipole magnet such as utilized in the embodiment of Figure 1;

Figure 3 is a side view of the magnet illustrated by Figure 2;

Figure 4 diagrammatically illustrates the positions of two members such as illustrated in Figures 2 and 3 such as when they are pulled from positions in which their unlike poles are in oppositely facing relationship;

Figure 5 diagrammatically illustrates another arrangement of magnetic elements; and Figure 6 illustrates pictorially an element which may be used to obtain the magnetic field arrangement of Figure 5.

Although the invention is specifically applied and herein described with respect to the package support of a twisting machine, the invention comprises, broadly, apparatus of which magnets having closely spaced poles are arranged along each of the opposite sides of an annular clearance between a member supported by a rotatable member and a third member of the apparatus with respect to which non-rotative relationship of the supported member is desired. The magnets in all cases are arranged so that they form a multiple pole field at each side of the clearance wherein the poles alternate in polarity and are uniformly and closely spaced in a circumferential direction so that the poles at one side of the clearance, when displaced, are subjected to forces of repulsion as well as those of attraction from the poles of the magnets at the opposite side.

In the twisting machine of Figure 1, a flyer 106 is secured to a spindle shaft 107 extending upwardly from a driving motor 108. The motor 108 is secured to a stationary frame member 110 of the twister. The package holder 112 is rotatably supported on the spindle shaft at the shoulders 114 and 115 thereof on the bearings 117 and 118. The outer races of the bearings are enclosed within annular resilient collars 119 and 120 which fit tightly within the central annular housing 122 of the holder 112 to absorb lateral vibration of the spindle. The holder has an outer cylindrical wall 123 having a rim section 124 providing an inner annular shoulder 125 for supporting a cover 127. A package 129 rests upon an annular resilient cushion of felt or other soft material which protects the end surface of the cake from contact with the surface 131 of the holder.

During operation, the shaft 107 turns at speeds varying from 5000 to 12,000 revolutions per minute. Although the bearings 117 and 118 may be of a highly improved type producing a minimum degree of drag or friction, there is sufficient friction in these bearings to build up a considerable rotative force on the holder when the shaft 107 is rotating. For restraining rotation of the holder, segmental multipole magnets 135 such as shown in Figures 2 and 3 are secured along the surface 136 of the holder 112 by means such as bolts 134. Other magnets 135 are mounted on stationary support members 137 so that the pole faces 138 of the magnets 135 are at opposite sides of a clearance defined by one plane containing the pole faces of the magnets supported by members 137 and a plane containing the faces of magnets supported by the holder 112. The clearance 140 is of sufficient depth to permit rotation of a radial member 142 of the flyer 106 which may comprise a disc or spokes. The member 142, fabricated from an insulating material, supports a rim section 144. The clearance 140 has sufficient depth to prevent any possible interference occurring between portions of the flyer or the opposing sets of elements 135 along the clearance during operation of the twisting machine. The intensity of the magnetic forces between poles of the elements at opposite sides of the clearance will vary inversely and approximately as the square of the depth of the clearance and it is therefore preferable to keep the depth to a minimum.

It is preferred that the poles of the magnets be uniformly angularly spaced in a direction extending concentrically with the axis of the shaft 107. This arrangement is desired in order to obtain the relationship shown in Figure 4 wherein a magnet 146 is illustrated as being pulled out of alignment with another magnet 147 separated from it by a clearance 145. For example, when the magnet 146 is pulled in the direction indicated by the arrow 146a relative to the stationary element 147, the north pole 149 of the element 146 is repelled by the north pole 150 and attracted by the south pole 151 of the element 147 when the pole 149 is in the position between the poles 150 and 151 of element 147, such as illustrated. A resultant of these forces exerted by the poles 151 and 150 on the pole 149 includes a substantial component having a direction indicated by the arrow 146b which opposes a force applied in the direction of the arrow 146a to the magnet 146 in a plane normal to the axis of rotation.

The advantages of the embodiments of the invention shown in Figures 1 to 6 may be appreciated by comparing the force relationships of the multipole magnets with the forces acting on a pair of bipole magnets mounted on adjacent relatively rotatable members opposite a clearance therebetween such as have been customarily used to prevent rotational displacement. In the conventional apparatus employing a pair of bipole magnets rotational displacement of one magnet with respect to the other to the extent that the pole of one magnet is opposite the space between the poles of the other magnet produces two attractive forces between the unlike poles and one repulsive force between like poles. This relationship may be expressed as a coefficient of restraining force per pole of ¾ according to the formula $F/N$ wherein F is the number of forces exerted by the poles and N is the number of poles. If four pairs of poles are employed as illustrated in Figure 4, four attractive forces A and three repulsive forces R are provided and the coefficient of restraining force per pole is ⅞. Thus by using a multipole arrangement, a required amount of restraining force may be applied by magnets which are cheaper and which occupy less space. A maximum restraining force per pole is provided by two continuous rings of properly spaced magnetic poles. In this case, the coefficient of restraining force per pole is 1.0.

The foregoing analysis of pole forces assumes that the intensity of magnetization in the clearance between magnetic faces is maintained constant and that the spacing between the poles of a magnetic unit is such that, when displaced, the attractive forces and the repulsive forces between the poles reach their respective maximum values with the same amount of displacement.

In Figure 5 an alternative arrangement is illustrated for arranging magnetic elements to obtain a multipole field in which the poles are uniformly spaced and adjacent poles along each side of an annular clearance have opposite polarity. Figure 6 illustrates a type of small cylindrical magnet 154 which may be secured on or within an annular surface 155 of any rotatably supported member such as the under surface of the package holder. Magnets 154 may be applied to such a surface in groups of two or more arranged concentrically with respect to the axis 157 of the surface. If preferred, the magnets may be arranged in one group consisting of a continuous ring. The magnets of any group are spaced so that there is approximately the same distance between the nearest poles of adjacent magnets as between the poles of a single magnet in the group in order to obtain fairly uniform spacing between all of the adjacent poles of the group. An axially-spaced stationary supporting member may be provided with a group of arcuately arranged correspondingly spaced magnets 154 on the opposite side of a clearance corresponding to the clearance 145 of Figure 4 to provide a required restraining force.

The multipole segments herein described and illustrated are constructed so that their pole faces lie within planes normal to the axis of rotation of the twister. Magnets of suitable shape or contour may be constructed to fit any annular surface or any type of annular clearance which may be found suitable in the operation of machinery typified by the two-for-one-twister described.

While preferred embodiments of the invention have been shown, it is to be understood that changes and variations may be made without departing from the spirit and scope of the invention as defined in the appended claims.

I claim:

1. In a twisting machine of the multiple twist type having a rotatable tubular spindle, a flier rotatable with said spindle and a yarn package carrier mounted for free rotation relative thereto; in combination therewith means for restraining said yarn package carrier from rotating with said spindle, said means comprising magnetic means fixed on the carrier and magnetic means spaced from the first-mentioned magnetic means lengthwise of the spindle axis, the first-mentioned magnetic means being capable of rotation relative to the other magnetic means, each magnetic means comprising at least one magnet and having a plurality of pairs of poles of opposite polarity disposed on each side of a plane in which the spindle axis lies along an arc concentric with said axis, the poles of the first-mentioned magnetic means facing the poles of the other and being normally in alignment therewith, said poles extending lengthwise of the spindle axis and parallel thereto and all of said poles being equidistant from said axis.

2. In a twister spindle, the combination of a rotatable tubular spindle having an inlet at one portion thereof and an outlet at another portion thereof adapted to receive yarn therethrough, a yarn carrier, and means for mounting the spindle and the yarn carrier for relative rotation; in combination therewith, means for restraining the yarn carrier from rotating with said spindle comprising magnetic means fixed on the carrier and arranged along an arc concentric with the axis of the spindle, and magnetic means in opposed substantially coaxial relationship spaced from the first-mentioned magnetic means lengthwise of the spindle axis, the first-mentioned magnetic means being capable of rotation relative to the other magnetic means, each magnetic means having a plurality of poles of opposite polarity disposed on each side of a plane in which the spindle axis lies and comprising a plurality of elements, each element having a pair of poles, the poles of the first-mentioned magnetic means facing the poles of the other and being normally in alignment therewith, said poles extending generally lengthwise of the spindle axis and being substantially equidistant therefrom.

3. In apparatus for unwinding yarn packages comprising a yarn-package carrying member, means for rotatably supporting said member for rotation relative to a second member about an axis in fixed relation with the second member; in combination therewith, means for restraining the first member from rotating with respect to the second member comprising separate magnetic means fixed to both members along arcs of approximately equal radial concentric to said axis, the magnetic means fixed to each member having a plurality of poles of opposite polarity disposed on each side of a plane in which the axis lies in spaced positions along respective arcs with poles of the same polarity occupying alternate positions, the poles associated with one member facing the poles of the other member and being normally in alignment therewith lengthwise of the axis, all poles of the magnetic means being uniformly spaced along respective arcs and extending generally lengthwise of the axis substantially equidistantly therefrom.

4. Apparatus as defined in claim 3 wherein the magnetic means comprises arcuate magnetic elements conforming generally to predetermined outer and inner radii, each element comprising a group of angularly-spaced poles.

5. Apparatus as defined in claim 3 wherein the magnetic means attached to each member comprises a plurality of bipole magnets disposed in spaced relationship along one or more arcs of the same general radius concentric with the axis of the rotatable member, adjacent poles of adjacent magnets having opposite polarity.

6. In apparatus for unwinding yarn packages comprising a yarn-package carrying member, means for rotatably supporting said member for rotation relative to a second member about an axis in fixed relation with the second member; in combination therewith, means for opposing the rotation of the first member about the axis comprising separate magnetic means fixed to each member having a plurality of poles which are uniformly angularly spaced along an arc concentric with the axis and disposed on opposite sides of a plane in which the axis lies, adjacent poles of the magnetic means associated with each member being opposite in polarity, the first member having in its normal position relative to the second member each pole thereof aligned oppositely and lengthwise of the axis and in spaced relation with a pole of the second member which is opposite in polarity, and rotatably independent non-magnetic means for engaging and twisting a yarn leaving the first member, said non-magnetic means extending through an annular clearance region which separates the magnetic means of one member from that of the other member, said axis being the axis of rotation of the non-magnetic means.

7. In apparatus for unwinding yarn packages comprising a yarn-package carrying member, means for rotatably supporting said member for rotation relative to a second member about an axis in fixed relation with the second member, said members having facing surfaces at opposite sides of a clearance region, said surfaces extending generally concentrically and radially with respect to an axis of rotation of one of the members; in combination therewith, means for restraining the first member from rotating relative to the other member comprising separate magnetic means fixed to said surfaces of both members, the magnetic means fixed to each member having a plurality of poles of opposite polarity in spaced alternate disposition along an arc concentric to said axis on each side of a plane in which the axis lies, the poles of both members being uniformly and equally spaced along respective arcs of disposition, poles of the same polarity along the same arc having alternate positions therealong, the poles associated with one member facing the poles of the other member and being normally in opposite alignment therewith, all of said poles extending generally lengthwise of the axis and being substantially equidistant therefrom.

8. In apparatus for unwinding packages of yarn comprising a spindle, a yarn package carrier mounted for free rotation relative to the spindle; in combination therewith, means for restraining said yarn package carrier from rotating with said spindle, said means comprising magnetic means fixed on the carrier and magnetic means spaced from the first-mentioned magnetic means lengthwise of the spindle axis, the first-mentioned magnetic means being capable of rotation relative to the other magnetic means, each magnetic means comprising at least one magnet and having a plurality of pairs of poles of opposite polarity disposed on each side of a plane in which the spindle axis lies along an arc concentric with said axis, the poles of the first-mentioned magnetic means facing the poles of the other and being normally in alignment therewith, said poles extending lengthwise of the spindle axis and parallel thereto and all of said poles being equidistant from said axis.

References Cited in the file of this patent

UNITED STATES PATENTS

| Number | Name | Date |
|---|---|---|
| 2,233,645 | Smith | Mar. 4, 1941 |
| 2,374,085 | Gwaltney | Apr. 17, 1945 |
| 2,411,126 | Burnham | Nov. 12, 1946 |
| 2,445,721 | Bartholomew | June 21, 1949 |
| 2,559,735 | Roberts | July 10, 1951 |
| 2,605,602 | Koella | Aug. 5, 1952 |